US012682838B2

(12) United States Patent
Lee

(10) Patent No.: US 12,682,838 B2
(45) Date of Patent: Jul. 14, 2026

(54) PIXEL, DISPLAY APPARATUS INCLUDING THE PIXEL AND ELECTRONIC APPARATUS INCLUDING THE PIXEL

(71) Applicant: Samsung Display Co., LTD., Yongin-si (KR)

(72) Inventor: Seung-Kyu Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/087,611

(22) Filed: Mar. 24, 2025

(65) Prior Publication Data

US 2026/0004716 A1 Jan. 1, 2026

(30) Foreign Application Priority Data

Jun. 26, 2024 (KR) ........................ 10-2024-0084025

(51) Int. Cl.
*G09G 3/32* (2016.01)

(52) U.S. Cl.
CPC ......... *G09G 3/32* (2013.01); *G09G 2300/043* (2013.01); *G09G 2300/0819* (2013.01); *G09G 2310/08* (2013.01); *G09G 2320/0209* (2013.01); *G09G 2320/0233* (2013.01)

(58) Field of Classification Search
CPC .. G09G 3/32; G09G 3/3233; G09G 2300/043; G09G 2300/0819; G09G 2310/08; G09G 2320/0209; G09G 2320/0233
See application file for complete search history.

(56) References Cited

U.S. PATENT DOCUMENTS 8,654,041 B2 * 2/2014 Kang .................. G09G 3/3233 345/82
9,280,931 B2 * 3/2016 Kimura ................ G09G 3/3233
11,587,957 B2 * 2/2023 Kimura ................ G09G 3/3233
12,176,356 B2 * 12/2024 Kimura ............. H10K 59/1213

(Continued)

FOREIGN PATENT DOCUMENTS

KR 1020210084097 A 7/2021
KR 1020230028681 A 3/2023

(Continued)

*Primary Examiner* — Christopher E Leiby
(74) *Attorney, Agent, or Firm* — CANTOR COLBURN LLP

(57) ABSTRACT

A pixel includes a light emitting element, a first switching element connected to a first node, a second node, and a third node, a first capacitor connected to the first node and a fourth node, a second capacitor connected to the fourth node and the third node, a second switching element applying a data voltage to the first capacitor, a third switching element applying a reference voltage to the first node, a fourth switching element receiving an initialization gate signal and an initialization voltage and connected to an anode electrode of the light emitting element, a fifth switching element receiving a first emission signal, a first electrode and a first power voltage and connected to the second node, a sixth switching element receiving a second emission signal and connected to the third node and the anode electrode, and a seventh switching element applying the reference voltage to the fourth node.

20 Claims, 12 Drawing Sheets

(56) References Cited

U.S. PATENT DOCUMENTS

| | | | | |
|---|---|---|---|---|
| 2006/0077134 | A1* | 4/2006 | Hector | G09G 3/3233 345/76 |
| 2008/0224965 | A1* | 9/2008 | Kim | G09G 3/3233 345/76 |
| 2010/0127956 | A1* | 5/2010 | Kang | G09G 3/3233 345/76 |
| 2011/0090200 | A1* | 4/2011 | Choi | G09G 3/3233 345/76 |
| 2012/0038605 | A1* | 2/2012 | Han | G09G 3/3233 345/76 |
| 2013/0063041 | A1* | 3/2013 | Kimura | H10D 86/441 315/291 |
| 2013/0088417 | A1* | 4/2013 | Kim | G09G 3/3225 345/82 |
| 2013/0092930 | A1* | 4/2013 | Kimura | G09G 3/3233 257/300 |
| 2015/0109278 | A1* | 4/2015 | Kim | G09G 3/3233 345/82 |
| 2017/0061876 | A1* | 3/2017 | Cho | G09G 3/3233 |
| 2021/0366390 | A1 | 11/2021 | Liu et al. | |
| 2023/0059858 | A1 | 2/2023 | Hong et al. | |
| 2023/0070020 | A1* | 3/2023 | Son | G09G 3/3266 |
| 2023/0145269 | A1* | 5/2023 | Oh | G09G 3/20 345/690 |
| 2024/0169916 | A1 | 5/2024 | Fan et al. | |

FOREIGN PATENT DOCUMENTS

| | | | |
|---|---|---|---|
| KR | 1020230034823 | A | 3/2023 |
| KR | 1020240008384 | A | 1/2024 |
| WO | 2024109023 | A1 | 5/2024 |

* cited by examiner

PIXEL, DISPLAY APPARATUS INCLUDING THE PIXEL AND ELECTRONIC APPARATUS INCLUDING THE PIXEL

PRIORITY STATEMENT

This application claims priority to Korean Patent Application No. 10-2024-0084025, filed on Jun. 26, 2024, and all the benefits accruing therefrom under 35 U.S.C. § 119, the content of which in its entirety is herein incorporated by reference.

BACKGROUND

1. Field

Embodiments supported by the present disclosure relate to a pixel, a display apparatus including the pixel, and an electronic apparatus including the pixel. More particularly, embodiments of the present disclosure relate to a pixel enhancing display quality, a display apparatus including the pixel, and an electronic apparatus including the pixel.

2. Description of the Related Art

Generally, a display apparatus includes a display panel and a display panel driver. The display panel includes a plurality of gate lines, a plurality of data lines, a plurality of emission lines, and a plurality of pixels. The display panel driver includes a gate driver, a data driver, an emission driver, and a driving controller. The gate driver outputs gate signals to the gate lines. The data driver outputs data voltages to the data lines. The emission driver outputs emission signals to the emission lines. The driving controller controls an operation of the gate driver, an operation of the data driver, and an operation of the emission driver.

In a conventional pixel, the data voltage may be written according to a ratio between a capacitance of a storage capacitor and a capacitance of a hold capacitor such that a gate-source voltage of a driving transistor becomes smaller than a swing width of the data voltage, and accordingly, a sensitivity of the driving transistor may increase. In an example in which the sensitivity of the driving transistor increases, crosstalk may occur, and a display defect may be generated (and display quality deteriorated) due to a touch noise or a cycle mura.

SUMMARY

Embodiments supported by the present disclosure provide a pixel including a first capacitor and a second capacitor connected in series between a control electrode of a first switching element and a second electrode of the first switch element. The pixel includes a seventh switching element applying a reference voltage to a node between the first capacitor and the second capacitor and receiving a data voltage at the control electrode of the first switching element or the node between the first capacitor and the second capacitor, which may enhance display quality.

Embodiments supported by the present disclosure also provide a display apparatus including the pixel.

Embodiments supported by the present disclosure also provide an electronic apparatus including the pixel.

In an embodiment of a pixel according to the present disclosure, the pixel includes a light emitting element, a first switching element, a first capacitor, a second capacitor, a second switching element, a third switching element, a fourth switching element, a fifth switching element, a sixth switching element and a seventh switching element. The first switching element includes a control electrode connected to a first node, a first electrode connected to a second node, and a second electrode connected to a third node. The first capacitor includes a first electrode connected to the first node and a second electrode connected to a fourth node. The second capacitor includes a first electrode connected to the fourth node and a second electrode connected to the third node. The second switching element applies a data voltage to the first capacitor. The third switching element applies a reference voltage to the first node. The fourth switching element includes a control electrode receiving an initialization gate signal, a first electrode receiving an initialization voltage, and a second electrode connected to an anode electrode of the light emitting element. The fifth switching element includes a control electrode receiving a first emission signal, a first electrode receiving a first power voltage, and a second electrode connected to the second node. The sixth switching element includes a control electrode receiving a second emission signal, a first electrode connected to the third node, and a second electrode connected to the anode electrode. The seventh switching element applies the reference voltage to the fourth node.

In an embodiment, the second switching element may include a control electrode receiving a writing gate signal, a first electrode receiving the data voltage, and a second electrode connected to the first node.

In an embodiment, the seventh switching element may include a control electrode receiving a first reference gate signal, a first electrode receiving the reference voltage, and a second electrode connected to the fourth node.

In an embodiment, the third switching element may include a control electrode receiving a second reference gate signal, a first electrode receiving the reference voltage, and a second electrode connected to the first node.

In an embodiment, the first reference gate signal may be a reference gate signal of an n-th stage. The second reference gate signal may be a reference gate signal of one of previous stages with respect to the n-th stage. n may be a natural number equal to or greater than two.

In an embodiment, the first emission signal may have an inactive level in an initialization period. The second emission signal may have an active level in the initialization period. The initialization gate signal may have an active level in the initialization period. The writing gate signal may have an inactive level in the initialization period.

In an embodiment, the first emission signal may have an active level in a compensation period subsequent to the initialization period. The second emission signal may have an inactive level in the compensation period. The second reference gate signal may have an active level in the compensation period. The first reference gate signal may have an active level in the compensation period. The initialization gate signal may have an inactive level in the compensation period. The writing gate signal may have the inactive level in the compensation period.

In an embodiment, the first emission signal may have the inactive level in a writing period subsequent to the compensation period. The second emission signal may have the inactive level in the writing period. The second reference gate signal may have an inactive level in the writing period. The first reference gate signal may have the active level in the writing period. The initialization gate signal may have the inactive level in the writing period. The writing gate signal may have an active pulse in the writing period.

In an embodiment, the first emission signal may have the active level in a light emission period subsequent to the writing period. The second emission signal may have the active level in the light emission period. The initialization gate signal may have the inactive level in the light emission period. The writing gate signal may have the inactive level in the light emission period.

In an embodiment, the first emission signal may have the inactive level in a second initialization period subsequent to the writing period. The second emission signal may have the active level in the second initialization period. The initialization gate signal may have the active level in the second initialization period. The writing gate signal may have the inactive level in the second initialization period.

In an embodiment, the second switching element and the seventh switching element may turn on in a writing period.

In an embodiment, the pixel may further include an eighth switching element including a control electrode receiving the initialization gate signal, a first electrode receiving a second initialization voltage, and a second electrode connected to the third node.

In an embodiment, the first emission signal may have an inactive level in an initialization period. The second emission signal may have an inactive level in the initialization period. The initialization gate signal may have an active level in the initialization period. The writing gate signal may have an inactive level in the initialization period.

In an embodiment, the first emission signal may have an active level in a compensation period subsequent to the initialization period. The second emission signal may have the inactive level in the compensation period. The second reference gate signal may have an active level in the compensation period. The first reference gate signal may have an active level in the compensation period. The initialization gate signal may have an inactive level in the compensation period. The writing gate signal may have the inactive level in the compensation period. The first emission signal may have the inactive level in a writing period subsequent to the compensation period. The second emission signal may have the inactive level in the writing period. The second reference gate signal may have an inactive level in the writing period. The first reference gate signal may have the active level in the writing period. The initialization gate signal may have the inactive level in the writing period. The writing gate signal may have an active pulse in the writing period. The first emission signal may have the active level in a light emission period subsequent to the writing period. The second emission signal may have an active level in the light emission period. The initialization gate signal may have the inactive level in the light emission period. The writing gate signal may have the inactive level in the light emission period.

In an embodiment, the second switching element may include a control electrode receiving a writing gate signal, a first electrode receiving the data voltage, and a second electrode connected to the fourth node.

In an embodiment, the seventh switching element may include a control electrode receiving a second reference gate signal, a first electrode receiving the reference voltage, and a second electrode connected to the fourth node.

In an embodiment, the third switching element may include a control electrode receiving a first reference gate signal, a first electrode receiving the reference voltage, and a second electrode connected to the first node.

In an embodiment, the first reference gate signal may be a reference gate signal of an n-th stage. The second reference gate signal may be a reference gate signal of one of previous stages with respect to the n-th stage. n may be a natural number equal to or greater than two.

In an embodiment, the second switching element and the third switching element may turn on in a writing period.

In an embodiment, the pixel may further include an eighth switching element including a control electrode receiving the initialization gate signal, a first electrode receiving a second initialization voltage, and a second electrode connected to the third node.

In an embodiment of a display apparatus according to the present disclosure, the display apparatus includes a display panel, a gate driver, a data driver and an emission driver. The display panel includes a pixel. The gate driver outputs an initialization gate signal to the pixel. The data driver outputs a data voltage to the pixel. The emission driver outputs a first emission signal and a second emission signal. The pixel includes a light emitting element, a first switching element including a control electrode connected to a first node, a first electrode connected to a second node, and a second electrode connected to a third node, a first capacitor including a first electrode connected to the first node and a second electrode connected to a fourth node, a second capacitor including a first electrode connected to the fourth node and a second electrode connected to the third node, a second switching element applying the data voltage to the first capacitor, a third switching element applying a reference voltage to the first node, a fourth switching element including a control electrode receiving the initialization gate signal, a first electrode receiving an initialization voltage, and a second electrode connected to an anode electrode of the light emitting element, a fifth switching element including a control electrode receiving the first emission signal, a first electrode receiving a first power voltage, and a second electrode connected to the second node, a sixth switching element including a control electrode receiving the second emission signal, a first electrode connected to the third node, and a second electrode connected to the anode electrode and a seventh switching element applying the reference voltage to the fourth node.

In an embodiment of an electronic apparatus according to the present disclosure, the electronic apparatus includes a display panel, a gate driver, a data driver, an emission driver, a driving controller and a processor. The display panel includes a pixel. The gate driver outputs an initialization gate signal to the pixel. The data driver outputs a data voltage to the pixel. The emission driver outputs a first emission signal and a second emission signal. The driving controller controls the gate driver, the data driver, and the emission driver. The processor outputs input image data and an input control signal to the driving controller. The pixel includes a light emitting element, a first switching element including a control electrode connected to a first node, a first electrode connected to a second node, and a second electrode connected to a third node, a first capacitor including a first electrode connected to the first node and a second electrode connected to a fourth node, a second capacitor including a first electrode connected to the fourth node and a second electrode connected to the third node, a second switching element applying the data voltage to the first capacitor, a third switching element applying a reference voltage to the first node, a fourth switching element including a control electrode receiving the initialization gate signal, a first electrode receiving an initialization voltage, and a second electrode connected to an anode electrode of the light emitting element, a fifth switching element including a control electrode receiving the first emission signal, a first electrode receiving a first power voltage, and a second electrode connected to the second node, a sixth switching element including a control electrode receiving the second emission signal, a first electrode connected to the third node, and a second electrode connected to the anode electrode, and a seventh switching element applying the reference voltage to the fourth node.

According to the pixel, the display apparatus including the pixel and the electronic apparatus including the pixel, the pixel includes the first capacitor and the second capacitor connected in series between the control electrode of the first switching element and the second electrode of the first switch element and includes the seventh switching element applying the reference voltage to the node between the first capacitor and the second capacitor. The data voltage may be directly applied to the control electrode of the first switching element or the node between the first capacitor and the second capacitor.

The threshold voltage of the first switching element may be applied to the second capacitor and the data voltage which is based on the reference voltage may be directly applied to the first capacitor such that the swing range of the data voltage and the range of the gate-source voltage of the first switching element may become similar.

The swing range of the data voltage and the range of the gate-source voltage of the first switching element are similar such that a slope of the current-voltage curve of the first switching element may be set low, and accordingly, the sensitivity of the first switching element may be reduced.

According to the decrease of the sensitivity of the first switching element, the display quality decreases due to the crosstalk and the touch noise and the cycle mura may be prevented such that the display quality of the display panel may be enhanced.

In some aspects, only the second capacitor may be initialized in the initialization period of the pixel such that an amount of the voltage for initialization may be reduced.

BRIEF DESCRIPTION OF THE DRAWINGS

The above and other features and advantages of the present disclosure will become more apparent by describing in detailed embodiments thereof with reference to the accompanying drawings, in which.

DETAILED DESCRIPTION

Figure 1:
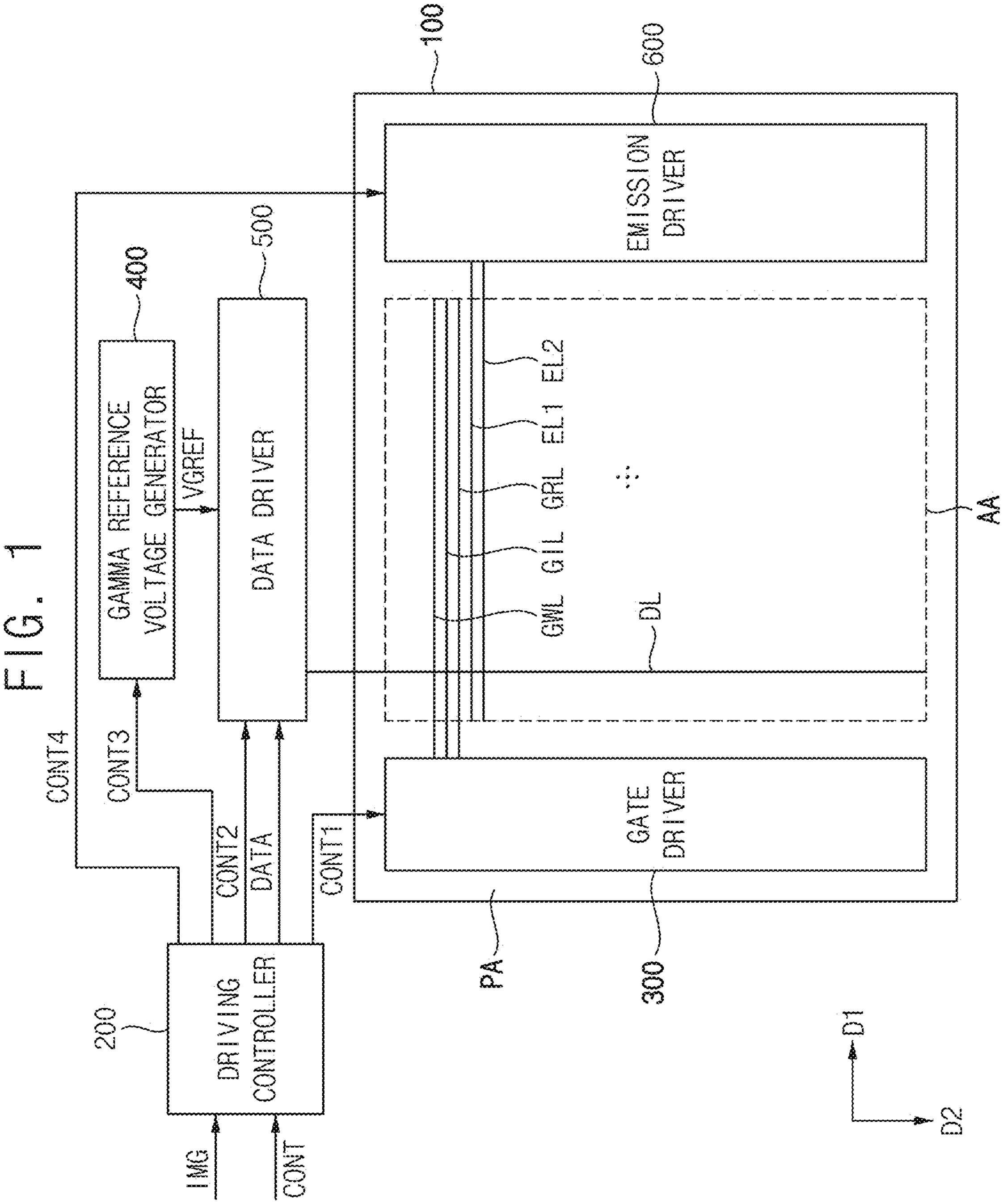
FIG. 1 is a block diagram illustrating a display apparatus according to an embodiment of the present disclosure.

Hereinafter, embodiments of the present disclosure will be explained in detail with reference to the accompanying drawings.

Embodiments supported by the present disclosure will now be described more fully hereinafter with reference to the accompanying drawings, in which one or more example embodiments are illustrated. Aspects supported by the present disclosure may, however, be embodied in different forms and should not be construed as limited to the embodiments set forth herein. Rather, these example embodiments are provided so that this disclosure will be thorough and complete, and will fully convey the scope of example aspects of the invention to those skilled in the art.

Terms such as, for example, first, second, and the like may be used to describe various components, but the components should not be limited by the terms. The terms as used herein may distinguish one component from other components and are not to be limited by the terms. For example, without departing the scope of the present disclosure, a first component may be referred to as a second component, and similarly, the second component may also be referred to as the first component. The terms of a singular form may include plural forms unless otherwise specified.

The terminology used herein is for the purpose of describing particular embodiments and is not intended to be limiting. As used herein, "a," "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, comp The terms "about" or "approximately" as used herein are inclusive of the stated value and include a suitable range of deviation for the particular value as determined by one of ordinary skill in the art, considering the measurement in question and the error associated with measurement of the particular quantity. The terms "about" or "approximately" can mean within one or more standard deviations, or within +30%, 20%, 10%, 5% of the stated value, for example.

The term "substantially," as used herein, means approximately or actually. The term "substantially equal" means approximately or actually equal. The term "substantially the same" means approximately or actually the same. The term "substantially identical" means approximately or actually identical. The term "substantially perpendicular" means approximately or actually perpendicular.

Spatially relative terms, such as, for example, "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terms "high level" (or alternatively, "high voltage level") and "low level" (or alternatively, "low voltage level") are relative terms describing levels of voltages which, when applied to a transistor described herein, may activate a transistor (e.g., turn "ON" the transistor) or deactivate a transistor (e.g., turn "OFF" the transistor) based on transistor type (e.g., P-type, N-type, or the like). The terms "active level" and "inactive level" describe levels of voltages which, when applied to a transistor described herein, may activate a transistor (e.g., turn "ON" the transistor) or deactivate a transistor (e.g., turn "OFF" the transistor) based on transistor type (e.g., P-type, N-type, or the like)

Embodiments are described herein with reference to cross section illustrations that are schematic illustrations of example embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases.

It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

FIG. 1 is a block diagram illustrating a display apparatus according to an embodiment of the present disclosure.

Referring to FIG. 1, the display apparatus includes a display panel 100 and a display panel driver. The display panel driver includes a driving controller 200, a gate driver 300, a gamma reference voltage generator 400, a data driver 500 and an emission driver 600.

For example, the driving controller 200 and the data driver 500 may be integrally formed (i.e., integrated into a single circuit or component). For example, the driving controller 200, the gamma reference voltage generator 400 and the data driver 500 may be integrally formed. A driving module including at least the driving controller 200 and the data driver 500 which are integrally formed may be referred to a timing controller embedded data driver ("TED").

The display panel 100 has a display region AA on which an image is displayed and a peripheral region PA adjacent to the display region AA.

The display panel 100 includes a plurality of gate lines GWL, GIL and GRL, a plurality of data lines DL, a plurality of emission lines EL1 and EL2 and a plurality of pixels electrically connected to the gate lines GWL, GIL and GRL, the data lines DL and the emission lines EL1 and EL2. The gate lines GWL, GIL and GRL may extend in a first direction D1, the data lines DL may extend in a second direction D2 crossing the first direction D1 and the emission lines EL1 and EL2 may extend in the first direction D1.

The driving controller 200 may receive input image data IMG and an input control signal CONT from an external apparatus. For example, the driving controller 200 may receive the input image data IMG and the input control signal CONT from a host or an application processor. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 may generate gate signals driving the gate lines GWL, GIL and GRL in response to the first control signal CONT1 received from the driving controller 200. The gate driver 300 may output the gate signals to the gate lines GWL, GIL and GRL. For example, the gate driver 300 may be integrated on the peripheral region PA of the display panel 100. For example, the gate driver 300 may be mounted on the peripheral region PA of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to a level of the data signal DATA.

In an embodiment, the gamma reference voltage generator 400 may be disposed in the driving controller 200, or in the data driver 500.

The data driver 500 may receive the second control signal CONT2 and the data signal DATA from the driving controller 200, and receive the gamma reference voltages VGREF from the gamma reference voltage generator 400. The data driver 500 may convert the data signal DATA into data voltages having an analog type using the gamma reference voltages VGREF. The data driver 500 may output the data voltages to the data lines DL.

The emission driver 600 may generate emission signals to drive the emission lines EL1 and EL2 in response to the fourth control signal CONT4 received from the driving controller 200. The emission driver 600 may output the emission signals to the emission lines EL1 and EL2. For example, the emission driver 600 may be integrated on the peripheral region PA of the display panel 100. For example, the emission driver 600 may be mounted on the peripheral region PA of the display panel 100.

Although the gate driver 300 is disposed at a first side of the display panel 100 and the emission driver 600 is disposed at a second side of the display panel 100 opposite to the first side in FIG. 1 for convenience of explanation, embodiments of the present disclosure are not limited thereto. For example, both of the gate driver 300 and the emission driver 600 may be disposed at the first side of the display panel 100. For example, both of the gate driver 300 and the emission driver 600 may be disposed both sides of the display panel 100. For example, the gate driver 300 and the emission driver 600 may be integrally formed.

Figure 2:
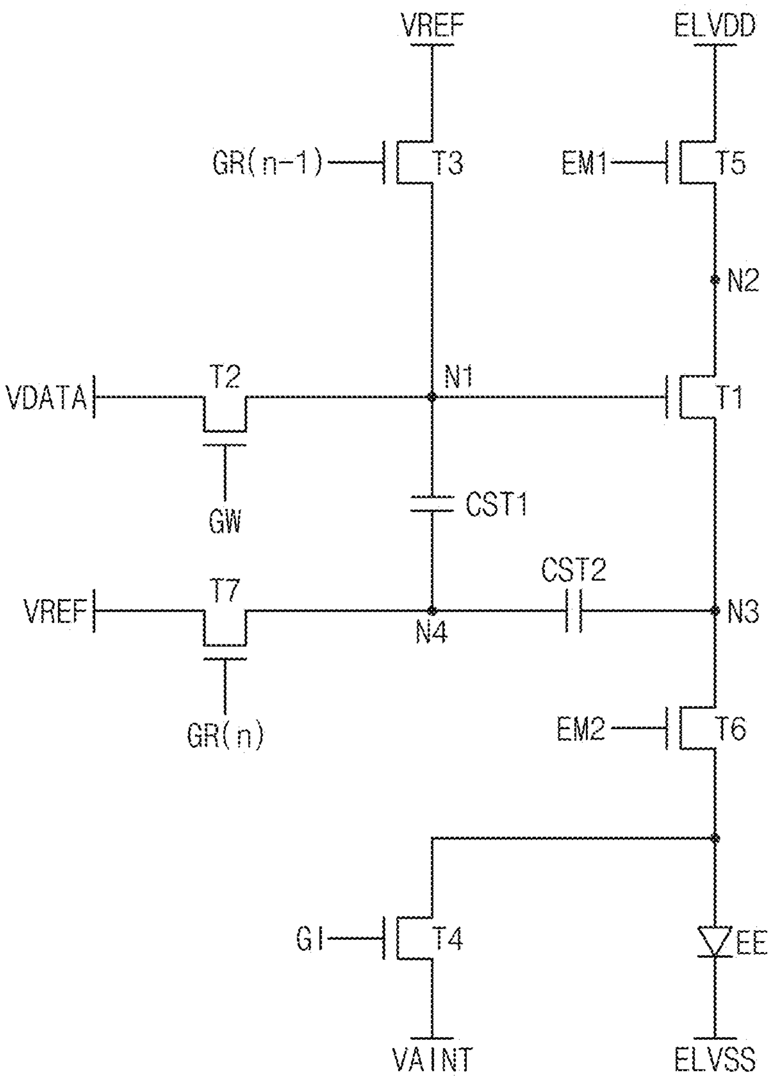
FIG. 2 is a circuit diagram illustrating a pixel of a display panel of FIG. 1.

FIG. 2 is a circuit diagram illustrating a pixel of the display panel 100 of FIG. 1.

Referring to FIGS. 1 and 2, the display panel 100 includes a plurality of pixels. Each of the pixels includes a light emitting element EE.

The pixel receives a writing gate signal GW, an initialization gate signal GI, a first reference gate signal GR(n), a second reference gate signal GR(n−1), the data voltage VDATA, a first emission signal EM1 and a second emission signal EM2 and the light emitting element EE emits a light according to a level of the data voltage VDATA to display an image.

In the present embodiment, the switching elements of the pixel may be oxide semiconductor thin film transistors. For example, the switching elements of the pixel may be N-type transistors.

For example, the pixel may include a first switching element T1, a second switching element T2, a third switching element T3, a fourth switching element T4, a fifth switching element T5, a sixth switching element T6, a seventh switching element T7, a first capacitor CST1, a second capacitor CST2 and the light emitting element EE.

The first switching element T1 includes a control electrode connected to a first node N1, a first electrode connected to a second node N2 and a second electrode connected to a third node N3. The first switching element T1 may be referred to as a driving switching element.

The first capacitor CST1 includes a first electrode connected to the first node N1 and a second electrode connected to a fourth node N4.

The second capacitor CST2 includes a first electrode connected to the fourth node N4 and a second electrode connected to the third node N3.

The second switching element T2 applies the data voltage VDATA to the first capacitor CST1.

The third switching element T3 applies a reference voltage VREF to the first node N1.

The fourth switching element T4 includes a control electrode receiving the initialization gate signal GI, a first electrode receiving an initialization voltage VAINT and a second electrode connected to an anode electrode of the light emitting element EE.

The fifth switching element T5 includes a control electrode receiving the first emission signal EM1, a first electrode receiving a first power voltage ELVDD and a second electrode connected to the second node N2.

The sixth switching element T6 includes a control electrode receiving the second emission signal EM2, a first electrode connected to the third node N3 and a second electrode connected to the anode electrode.

The seventh switching element T7 applies the reference voltage VREF to the fourth node N4.

The light emitting element EE may include the anode electrode and a cathode electrode receiving a second power voltage ELVSS. For example, the first power voltage ELVDD may be greater than the second power voltage ELVSS.

For example, the initialization voltage VAINT may be less than the first power voltage ELVDD and may be greater than the second power voltage ELVSS.

In the present embodiment, the second switching element T2 may include a control electrode receiving the writing gate signal GW, a first electrode receiving the data voltage VDATA and a second electrode connected to the first node N1.

In the present embodiment, the seventh switching element T7 may include a control electrode receiving the first reference gate signal (e.g., GR(n)), a first electrode receiving the reference voltage VREF and a second electrode connected to the fourth node N4.

In the present embodiment, the third switching element T3 may include a control electrode receiving the second reference gate signal (e.g., GR(n−1)), a first electrode receiving the reference voltage VREF and a second electrode connected to the first node N1.

In the present embodiment, a white data voltage may be greater than a black data voltage. In the present embodiment, a data voltage representing a high grayscale value may be greater than a data voltage representing a low grayscale value. For example, the reference voltage VREF may be less than the white data voltage and greater than the black data voltage. For example, the reference voltage VREF may be less than the first power voltage ELVDD.

In the present embodiment, the first reference gate signal GR(n) may be a reference gate signal of an n-th stage. The second reference gate signal GR(n−1) may be a reference gate signal of one of previous stages with respect to the n-th stage. Herein, n may be a natural number equal to or greater than two. For example, the second reference gate signal GR(n−1) may be a reference gate signal of a stage immediately preceding the n-th stage. The n-th stage may mean a stage of a gate driving circuit corresponding to an n-th pixel row of the display panel 100.

The writing gate signal GW, the initialization gate signal GI, the first emission signal EM1 and the second emission signal EM2 which do not include (n) in FIG. 2 may be signals of the n-th stage. For example, the writing gate signal GW in FIG. 2 and the writing gate signal GW(n) in FIG. 3 may have the same meaning. For example, the initialization gate signal GI in FIG. 2 and the initialization gate signal GI(n) in FIG. 3 may have the same meaning. For example, the first emission signal EM1 in FIG. 2 and the first emission signal EM1(*n*) in FIG. 3 may have the same meaning. For example, the second emission signal EM2 in FIG. 2 and the second emission signal EM2 (*n*) in FIG. 3 may have the same meaning.

With reference to an example in which the first reference gate signal GR(n) is the reference gate signal of the n-th stage and the second reference gate signal GR(n−1) is the reference gate signal of one of the previous stages with respect to the n-th stage, the first reference gate signal GR(n) and the second reference gate signal GR(n−1) are generated from the same gate driving circuit such that a manufacturing cost of the display apparatus may be reduced and a dead space of the display apparatus may be reduced.

Figure 3:
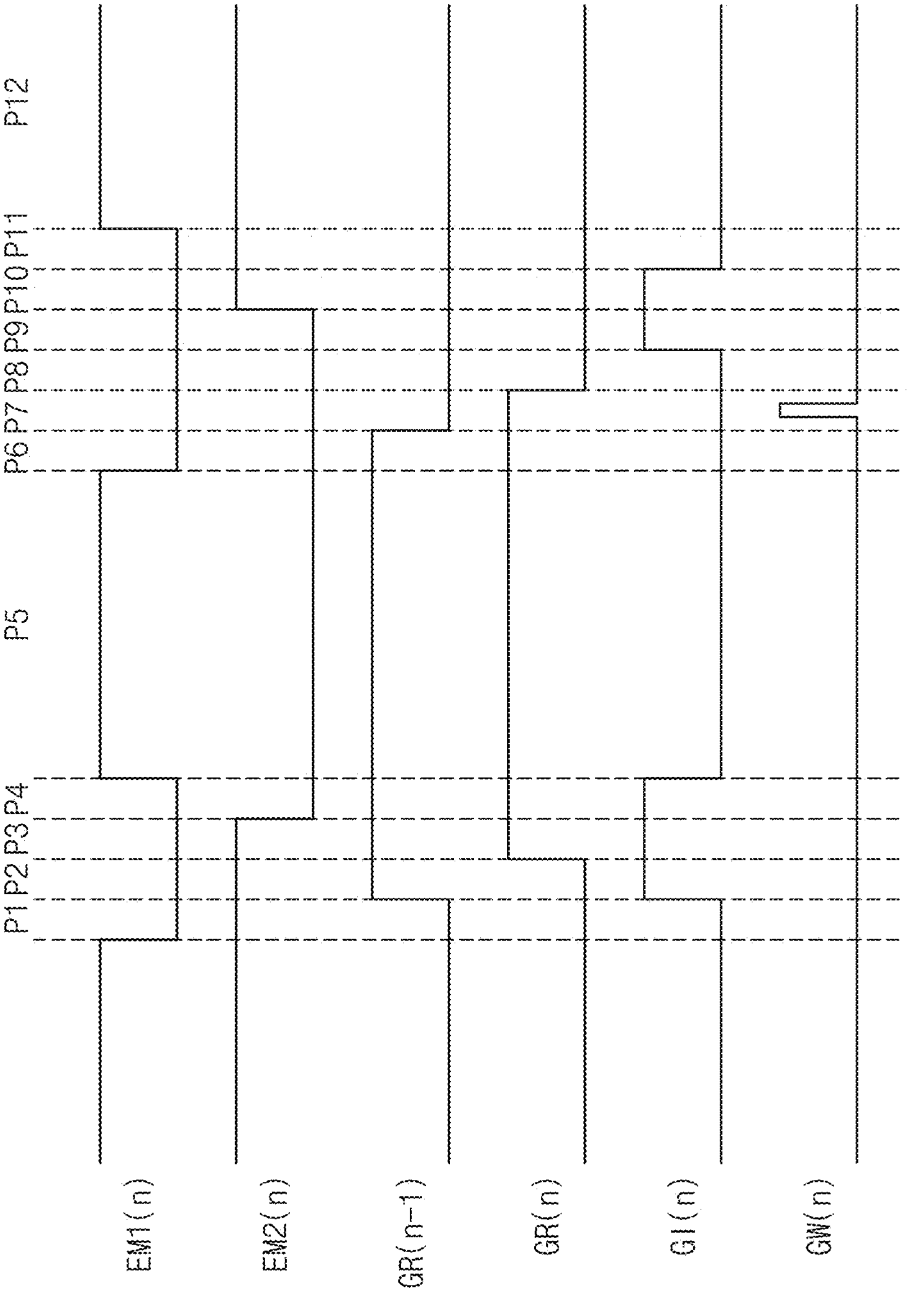
FIG. 3 is a timing diagram illustrating an example of input signals applied to the pixel of FIG. 2.

FIG. 3 is a timing diagram illustrating an example of input signals applied to the pixel of FIG. 2.

Referring to FIGS. 1 to 3, a driving timing of the pixel may include an initialization period, a compensation period, a writing period and a light emission period.

In the initialization period P2 and P3 of FIG. 3, the first emission signal EM1 may have an inactive level, the second emission signal EM2 may have an active level, the initialization gate signal GI may have an active level and the writing gate signal GW may have an inactive level.

With reference to an example in which the first emission signal EM1, the second emission signal EM2, the second reference gate signal GR(n−1), the first reference gate signal GR(n), the initialization gate signal GI and the writing gate signal GW are applied to P-type transistors, active levels of the first emission signal EM1, the second emission signal EM2, the second reference gate signal GR(n−1), the first reference gate signal GR(n), the initialization gate signal GI and the writing gate signal GW may be low levels and inactive levels of the first emission signal EM1, the second emission signal EM2, the second reference gate signal GR(n−1), the first reference gate signal GR(n), the initialization gate signal GI and the writing gate signal GW may be high levels.

In contrast, with reference to an example in which the first emission signal EM1, the second emission signal EM2, the second reference gate signal GR(n−1), the first reference gate signal GR(n), the initialization gate signal GI and the writing gate signal GW are applied to N-type transistors, active levels of the first emission signal EM1, the second emission signal EM2, the second reference gate signal GR(n−1), the first reference gate signal GR(n), the initialization gate signal GI and the writing gate signal GW may be high levels and inactive levels of the first emission signal EM1, the second emission signal EM2, the second reference gate signal GR(n−1), the first reference gate signal GR(n), the initialization gate signal GI and the writing gate signal GW may be low levels.

In FIG. 2, the first to seventh switching elements T1 to T7 may be N-type transistors such that active levels of the first emission signal EM1, the second emission signal EM2, the second reference gate signal GR(n−1), the first reference gate signal GR(n), the initialization gate signal GI and the writing gate signal GW may be high levels and inactive levels of the first emission signal EM1, the second emission signal EM2, the second reference gate signal GR(n−1), the first reference gate signal GR(n), the initialization gate signal GI and the writing gate signal GW may be low levels.

In the initialization period P2 and P3 of FIG. 3, the fourth switching element T4 may turn on in response to the initialization gate signal GI such that the initialization voltage VAINT is applied to the anode electrode of the light emitting element EE.

In some aspects, in the initialization period P2 and P3 of FIG. 2, the sixth switching element T6 may turn on in response to the second emission signal EM2 such that the initialization voltage VAINT is applied to the third node N3.

In the compensation period P5 of FIG. 3 subsequent to the initialization period P2 and P3 of FIG. 3, the first emission signal EM1 may have an active level, the second emission signal EM2 may have an inactive level, the second reference gate signal GR(n−1) may have an active level, the first reference gate signal GR(n) may have an active level, the initialization gate signal GI may have an inactive level and the writing gate signal GW may have the inactive level.

In the compensation period P5 of FIG. 3, the third switching element T3 may turn on in response to the second reference gate signal GR(n−1) such that the reference voltage VREF is applied to the first node N1.

In the compensation period P5 of FIG. 3, the seventh switching element T7 may turn on in response to the first reference gate signal GR(n) such that the reference voltage VREF is applied to the fourth node N4.

In the compensation period P5 of FIG. 3, the fifth switching element T5 may turn on in response to the first emission signal EM1(*n*) such that a voltage level of the third node N3 is a sum of the reference voltage VREF and an absolute value of a threshold voltage of the first switching element T1.

For example, in the compensation period P5 of FIG. 3, the threshold voltage of the first switching element T1 may be written to the second capacitor CST2.

In the writing period P7 of FIG. 3 subsequent to the compensation period P5 of FIG. 3, the first emission signal EM1 may have the inactive level, the second emission signal EM2 may have the inactive level, the second reference gate signal GR(n−1) may have an inactive level, the first reference gate signal GR(n) may have the active level, the initialization gate signal GI may have the inactive level and the writing gate signal GW may have an active pulse (i.e., the writing gate signal GW may transition to the active level and back to the inactive level during the writing period P7).

In the writing period P7 of FIG. 3, the seventh switching element T7 may turn on in response to the first reference gate signal GR(n) such that the reference voltage VREF is applied to the fourth node N4.

In the writing period P7 of FIG. 3, the second switching element T2 may turn on in response to the writing gate signal GW such that the data voltage VDATA is applied to the first node N1.

In the writing period P7 of FIG. 3 of the present embodiment, the second switching element T2 and the seventh switching element T7 may turn on such that the data voltage VDATA is written to the first capacitor CST1 with respect to the reference voltage VREF. In the light emission period P12 of FIG. 3 subsequent to the writing period P7 of FIG. 3, the first emission signal EM1 may have the active level, the second emission signal EM2 may have the active level, the initialization gate signal GI may have the inactive level and the writing gate signal GW may have the inactive level.

In the light emission period P12 of FIG. 3, the light emitting element EE may emit a light through a current path formed along the fifth switching element T5 turned on in response to the first emission signal EM1, the first switching element T1 turned on according to the data voltage VDATA and the sixth switching element T6 turned on in response to the second emission signal EM2.

The driving timing of the pixel of the present embodiment may further include a second initialization period P10 of FIG. 3.

In the present embodiment, in the second initialization period P10 of FIG. 3 between the writing period P7 of FIG. 3 and the light emission period P12 of FIG. 3, the first emission signal EM1 may have the inactive level, the second emission signal EM2 may have the active level, the initialization gate signal GI may have the active level and the writing gate signal GW may have the inactive level.

In the second initialization period P10 of FIG. 3, the fourth switching element T4 may turn on in response to the initialization gate signal GI such that the initialization voltage VAINT is applied to the anode electrode of the light emitting element EE.

In some aspects, in the second initialization period P10 of FIG. 3, the sixth switching element T6 may turn on in response to the second emission signal EM2 such that the initialization voltage VAINT is applied to the third node N3.

Figure 4:
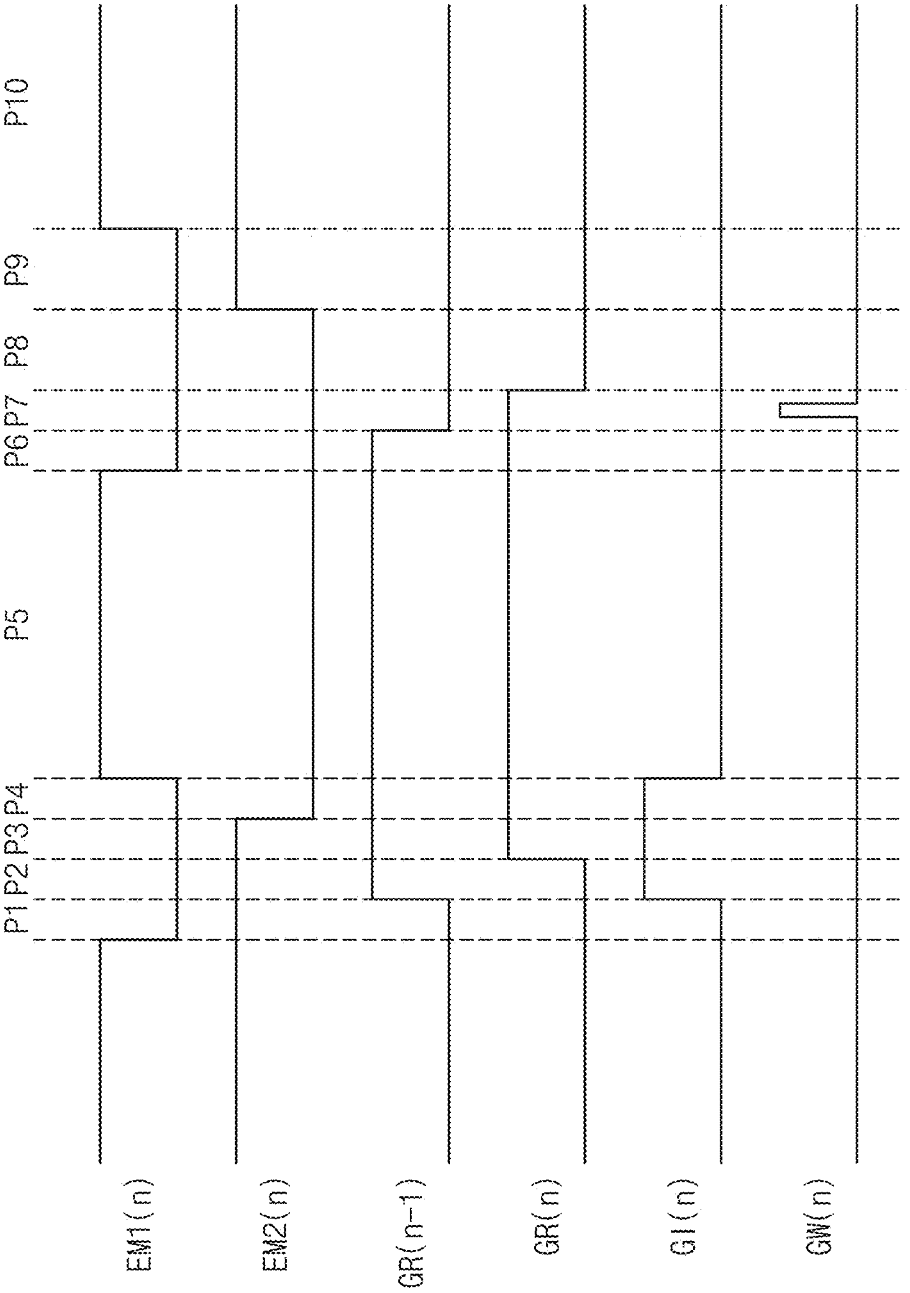
FIG. 4 is a timing diagram illustrating an example of input signals applied to the pixel of FIG. 2.

FIG. 4 is a timing diagram illustrating an example of input signals applied to the pixel of FIG. 2.

The driving timing of the pixel of FIG. 4 may be substantially the same as the driving timing of the pixel of FIG. 3 except that the driving timing does not include the second initialization period. For example, the driving timing of the pixel of FIG. 4 may be substantially the same as the driving timing of the pixel of FIG. 3 except that the waveform of the initialization gate signal GI does not include the second active period. Thus, the same reference numerals will be used to refer to the same or like parts as those described in the previous embodiment of FIGS. 1 to 3 and any repetitive explanation concerning the above elements will be omitted.

Referring to FIGS. 1, 2 and 4, a driving timing of the pixel may include an initialization period, a compensation period, a writing period and a light emission period.

In the initialization period P2 and P3 of FIG. 4, the first emission signal EM1 may have an inactive level, the second emission signal EM2 may have an active level, the initialization gate signal GI may have an active level and the writing gate signal GW may have an inactive level.

In the compensation period P5 of FIG. 4 subsequent to the initialization period P2 and P3 of FIG. 4, the first emission signal EM1 may have an active level, the second emission signal EM2 may have an inactive level, the second reference gate signal GR(n−1) may have an active level, the first reference gate signal GR(n) may have an active level, the initialization gate signal GI may have an inactive level and the writing gate signal GW may have the inactive level.

In the writing period P7 of FIG. 4 subsequent to the compensation period P5 of FIG. 4, the first emission signal EM1 may have the inactive level, the second emission signal EM2 may have the inactive level, the second reference gate signal GR(n−1) may have an inactive level, the first reference gate signal GR(n) may have the active level, the initialization gate signal GI may have the inactive level and the writing gate signal GW may have an active pulse (i.e., the writing gate signal GW may have an active level in a portion of the writing period P7). In the light emission period P10 of FIG. 4 subsequent to the writing period P7 of FIG. 4, the first emission signal EM1 may have the active level, the second emission signal EM2 may have the active level, the initialization gate signal GI may have the inactive level and the writing gate signal GW may have the inactive level.

According to the present embodiment, the pixel includes the first capacitor CST1 and the second capacitor CST2 connected in series between the control electrode of the first switching element T1 and the second electrode of the first switch element T1 and includes the seventh switching element T7 applying the reference voltage VREF to the node between the first capacitor CST1 and the second capacitor CST2. The data voltage VDATA may be directly applied to the control electrode N1 of the first switching element T1.

The threshold voltage of the first switching element T1 may be applied to the second capacitor CST2 and the data voltage VDATA which is based on the reference voltage VREF may be directly applied to the first capacitor CST1 such that the swing range of the data voltage VDATA and the range of the gate-source voltage of the first switching element T1 may become similar.

The swing range of the data voltage VDATA and the range of the gate-source voltage of the first switching element T1 are similar such that a slope of the current-voltage curve of the first switching element T1 may be set low, and accordingly, the sensitivity of the first switching element T1 may be reduced.

Based on the decrease of the sensitivity of the first switching element T1, a decrease in the display quality due to the crosstalk and the touch noise and the cycle mura may be prevented such that the display quality of the display panel 100 may be enhanced.

In some aspects, the second capacitor CST2 may be initialized in the initialization period of the pixel (and the first capacitor CST1 is not initialized in the initialization period) such that an amount of the voltage for initialization may be reduced.

Figure 5:
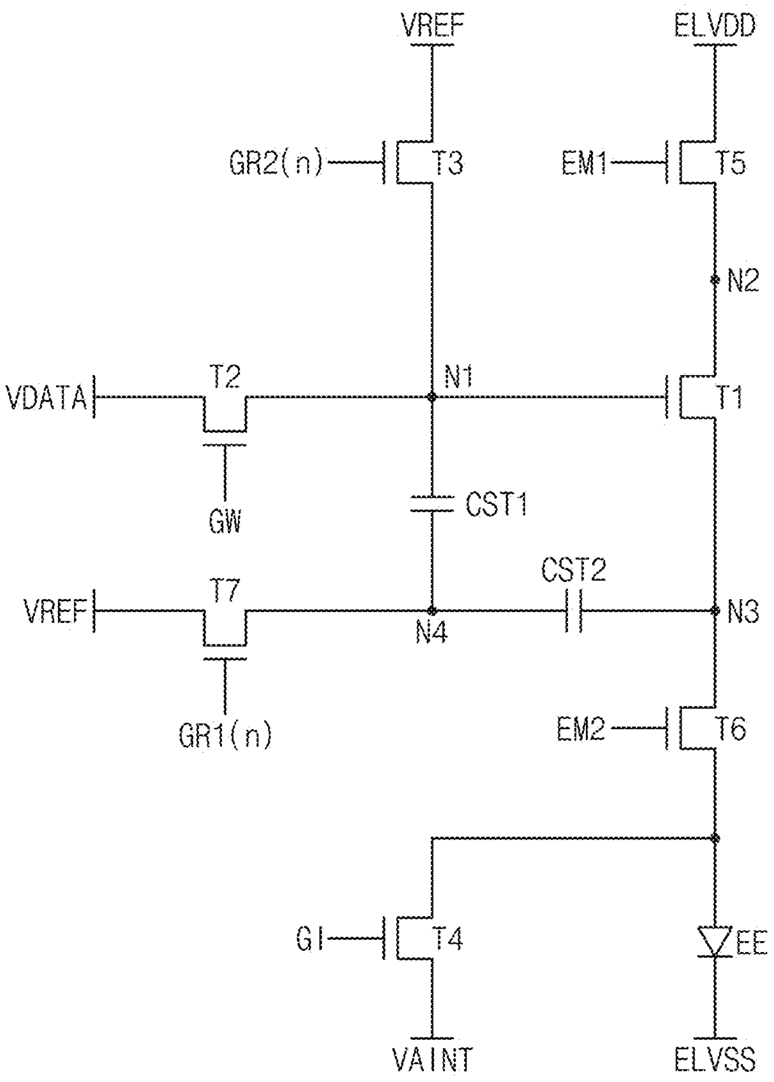
FIG. 5 is a circuit diagram illustrating a pixel of a display panel of a display apparatus according to an embodiment of the present disclosure.
Figure 6:
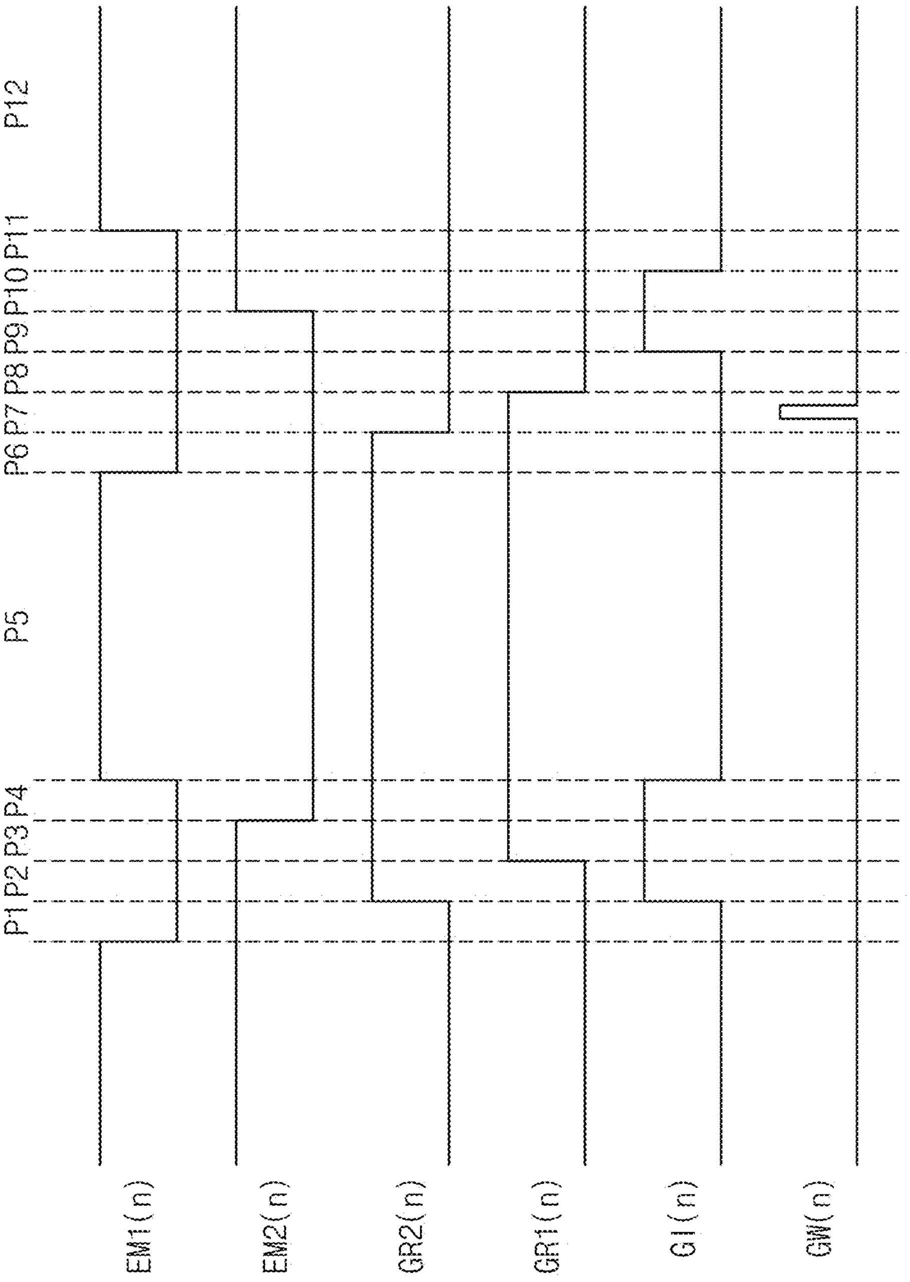
FIG. 6 is a timing diagram illustrating an example of input signals applied to the pixel of FIG. 5.

FIG. 5 is a circuit diagram illustrating a pixel of a display panel 100 of a display apparatus according to an embodiment of the present disclosure. FIG. 6 is a timing diagram illustrating an example of input signals applied to the pixel of FIG. 5.

The display apparatus according to the present embodiment is substantially the same as the display apparatus of the previous embodiment explained referring to FIGS. 1 to 4 except that the first reference gate signal and the second reference gate signal are independent signals generated from independent gate driving circuits. Thus, the same reference numerals will be used to refer to the same or like parts as those described in the previous embodiment of FIGS. 1 to 4 and any repetitive explanation concerning the above elements will be omitted.

Referring to FIGS. 1, 5 and 6, for example, the pixel may include a first switching element T1, a second switching element T2, a third switching element T3, a fourth switching element T4, a fifth switching element T5, a sixth switching element T6, a seventh switching element T7, a first capacitor CST1, a second capacitor CST2 and the light emitting element EE.

In the present embodiment, the seventh switching element T7 may include a control electrode receiving a first reference gate signal (e.g., GR1(*n*)), a first electrode receiving the reference voltage VREF and a second electrode connected to the fourth node N4.

In the present embodiment, the third switching element T3 may include a control electrode receiving a second reference gate signal (e.g., GR2(*n*)), a first electrode receiving the reference voltage VREF and a second electrode connected to the first node N1.

In the present embodiment, the first reference gate signal GR1(*n*) and the second reference gate signal GR2(*n*) are independent signals generated from independent gate driving circuits unlike the embodiment of FIGS. 1 to 4.

According to the present embodiment, the pixel includes the first capacitor CST1 and the second capacitor CST2 connected in series between the control electrode of the first switching element T1 and the second electrode of the first switch element T1 and includes the seventh switching element T7 applying the reference voltage VREF to the node between the first capacitor CST1 and the second capacitor CST2. The data voltage VDATA may be directly applied to the control electrode N1 of the first switching element T1.

The threshold voltage of the first switching element T1 may be applied to the second capacitor CST2 and the data voltage VDATA which is based on the reference voltage VREF may be directly applied to the first capacitor CST1 such that the swing range of the data voltage VDATA and the range of the gate-source voltage of the first switching element T1 may become similar.

The swing range of the data voltage VDATA and the range of the gate-source voltage of the first switching element T1 are similar such that a slope of the current-voltage curve of the first switching element T1 may be set low, and accordingly, the sensitivity of the first switching element T1 may be reduced.

According to the decrease of the sensitivity of the first switching element T1, the display quality decreases due to the crosstalk and the touch noise and the cycle mura may be prevented such that the display quality of the display panel 100 may be enhanced.

In some aspects, only the second capacitor CST2 may be initialized in the initialization period of the pixel such that an amount of the voltage for initialization may be reduced.

Figure 7:
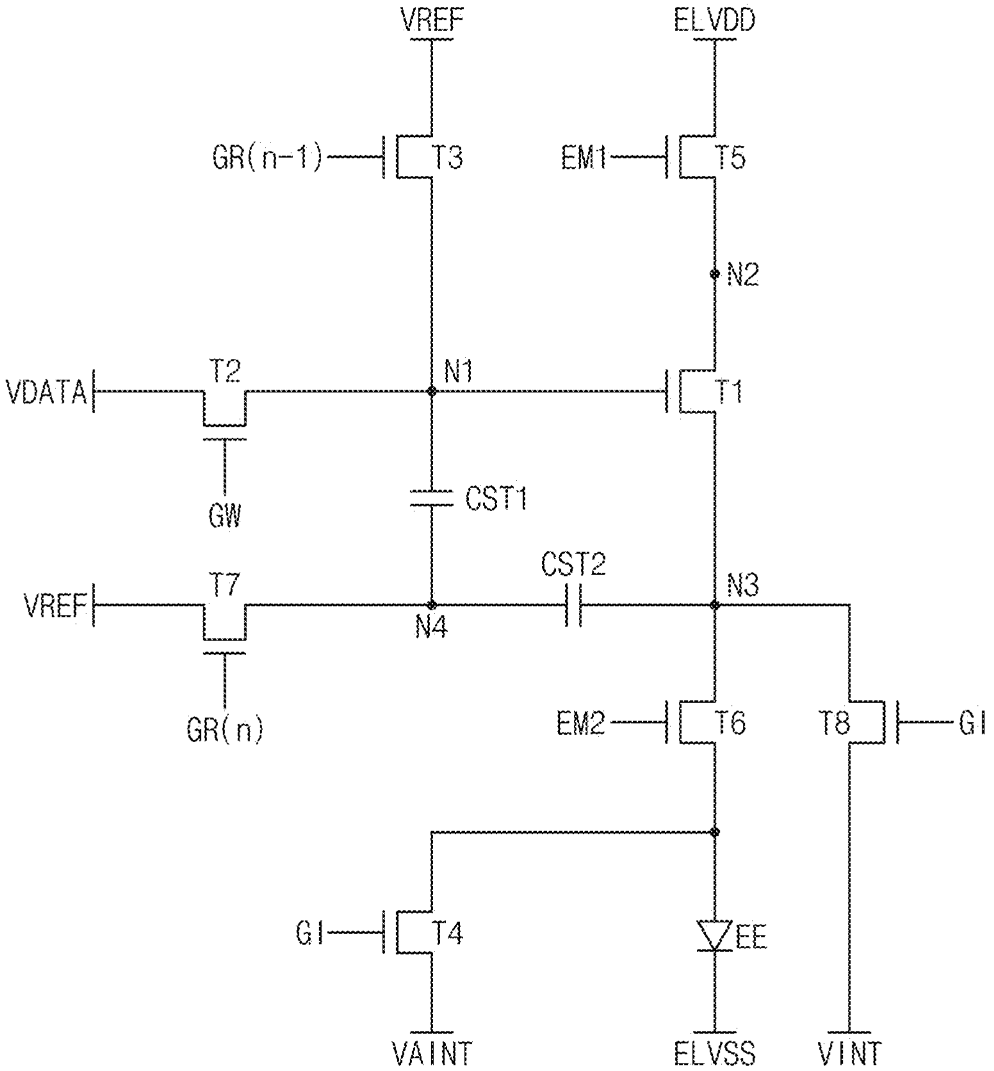
FIG. 7 is a circuit diagram illustrating a pixel of a display panel of a display apparatus according to an embodiment of the present disclosure.
Figure 8:
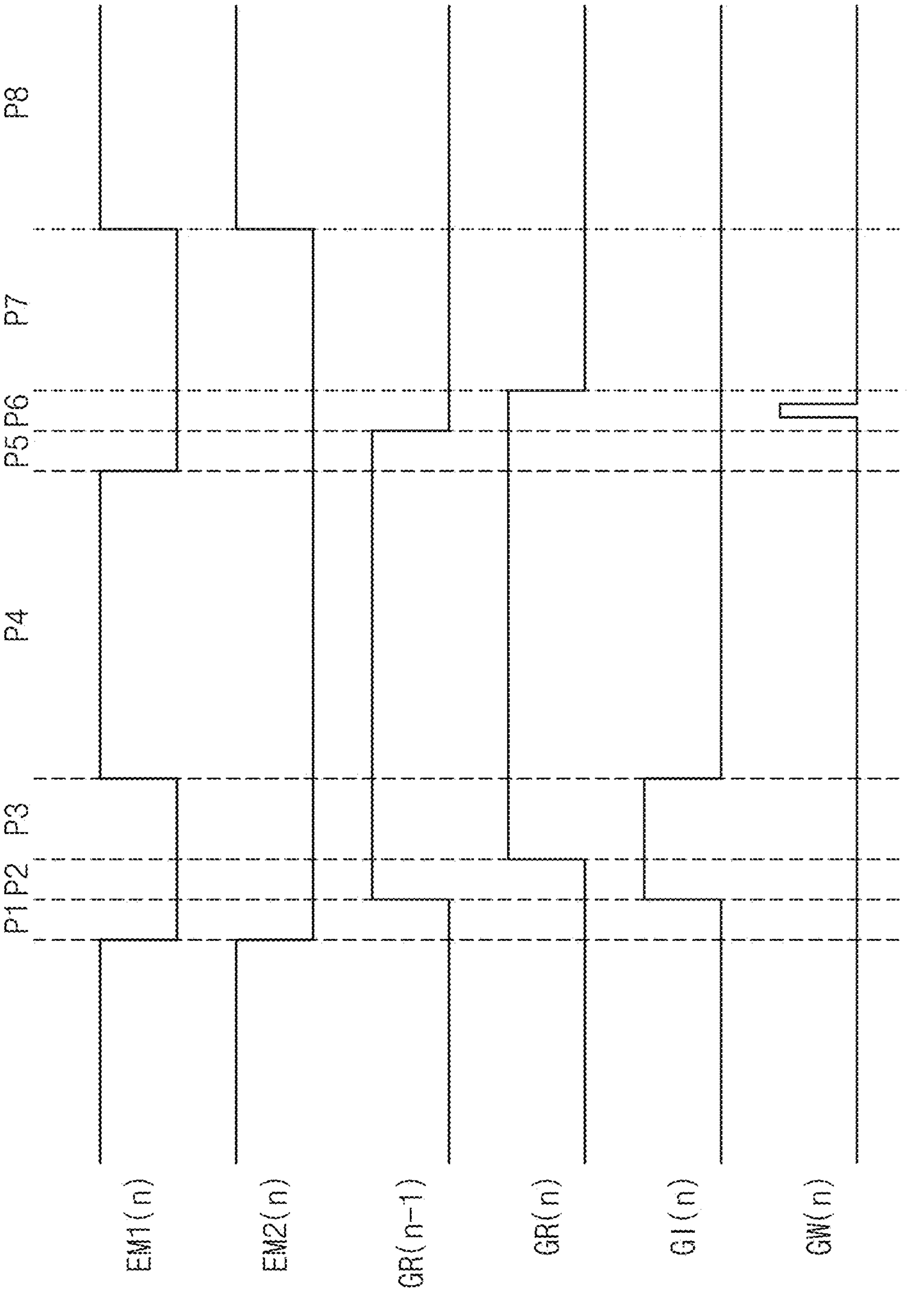
FIG. 8 is a timing diagram illustrating an example of input signals applied to the pixel of FIG. 7.

FIG. 7 is a circuit diagram illustrating a pixel of a display panel 100 of a display apparatus according to an embodiment of the present disclosure. FIG. 8 is a timing diagram illustrating an example of input signals applied to the pixel of FIG. 7.

The display apparatus according to the present embodiment is substantially the same as the display apparatus of the previous embodiment explained referring to FIGS. 1 to 4 except that the pixel further includes an eighth switching element. Thus, the same reference numerals will be used to refer to the same or like parts as those described in the previous embodiment of FIGS. 1 to 4 and any repetitive explanation concerning the above elements will be omitted.

Referring to FIGS. 1, 7 and 8, for example, the pixel may include a first switching element T1, a second switching element T2, a third switching element T3, a fourth switching element T4, a fifth switching element T5, a sixth switching element T6, a seventh switching element T7, a first capacitor CST1, a second capacitor CST2 and the light emitting element EE. The pixel may further include an eighth switching element T8.

The fourth switching element T4 includes a control electrode receiving the initialization gate signal GI, a first electrode receiving an initialization voltage VAINT and a second electrode connected to an anode electrode of the light emitting element EE.

The sixth switching element T6 includes a control electrode receiving the second emission signal EM2, a first electrode connected to the third node N3 and a second electrode connected to the anode electrode.

The eighth switching element T8 includes a control electrode receiving the initialization gate signal GI, a first electrode receiving a second initialization voltage VINT and a second electrode connected to the third node N3.

For example, the initialization voltage VAINT may be less than the first power voltage ELVDD and greater than the second power voltage ELVSS. For example, the second initialization voltage VINT may be less than the first power voltage ELVDD and greater than the second power voltage ELVSS. For example, the second initialization voltage VINT may be greater than the initialization voltage VAINT.

An optimal voltage for initializing the anode electrode of the light emitting element EE may be different from an optimal voltage for initializing the second electrode (the third node N3) of the second capacitor CST2. In the present embodiment, the initialization voltage VAINT initializing the anode electrode of the light emitting element EE and the second initialization voltage VINT initializing the second electrode (the third node N3) of the second capacitor CST2 may be differently set such that the display quality of the display panel 100 may be further enhanced.

A driving timing of the pixel may include an initialization period, a compensation period, a writing period and a light emission period.

In the initialization period P2 and P3 of FIG. 8, the first emission signal EM1 may have an inactive level, the second emission signal EM2 may have an inactive level, the initialization gate signal GI may have an active level and the writing gate signal GW may have an inactive level.

In the initialization period P2 and P3 of FIG. 8, the fourth switching element T4 may turn on in response to the initialization gate signal GI such that the initialization voltage VAINT is applied to the anode electrode of the light emitting element EE.

In the initialization period P2 and P3 of FIG. 8, the eighth switching element T8 may turn on in response to the initialization gate signal GI such that the second initialization voltage VINT is applied to the third node N3.

In the compensation period P4 of FIG. 8 subsequent to the initialization period P2 and P3 of FIG. 8, the first emission signal EM1 may have an active level, the second emission signal EM2 may have the inactive level, the second reference gate signal GR(n−1) may have an active level, the first reference gate signal GR(n) may have an active level, the initialization gate signal GI may have an inactive level and the writing gate signal GW may have the inactive level.

In the writing period P6 of FIG. 8 subsequent to the compensation period P4 of FIG. 8, the first emission signal EM1 may have the inactive level, the second emission signal EM2 may have the inactive level, the second reference gate signal GR(n−1) may have an inactive level, the first reference gate signal GR(n) may have the active level, the initialization gate signal GI may have the inactive level and the writing gate signal GW may have an active pulse. In the light emission period P8 of FIG. 8 subsequent to the writing period P6 of FIG. 8, the first emission signal EM1 may have the active level, the second emission signal EM2 may have an active level, the initialization gate signal GI may have the inactive level and the writing gate signal GW may have the inactive level.

According to the present embodiment, the pixel includes the first capacitor CST1 and the second capacitor CST2 connected in series between the control electrode of the first switching element T1 and the second electrode of the first switch element T1 and includes the seventh switching element T7 applying the reference voltage VREF to the node between the first capacitor CST1 and the second capacitor CST2. The data voltage VDATA may be directly applied to the control electrode N1 of the first switching element T1.

The threshold voltage of the first switching element T1 may be applied to the second capacitor CST2 and the data voltage VDATA which is based on the reference voltage VREF may be directly applied to the first capacitor CST1 such that the swing range of the data voltage VDATA and the range of the gate-source voltage of the first switching element T1 may become similar.

The swing range of the data voltage VDATA and the range of the gate-source voltage of the first switching element T1 are similar such that a slope of the current-voltage curve of the first switching element T1 may be set low, and accordingly, the sensitivity of the first switching element T1 may be reduced.

According to the decrease of the sensitivity of the first switching element T1, the display quality decreases due to the crosstalk and the touch noise and the cycle mura may be prevented such that the display quality of the display panel 100 may be enhanced.

In some aspects, only the second capacitor CST2 may be initialized in the initialization period of the pixel such that an amount of the voltage for initialization may be reduced.

Figure 9:
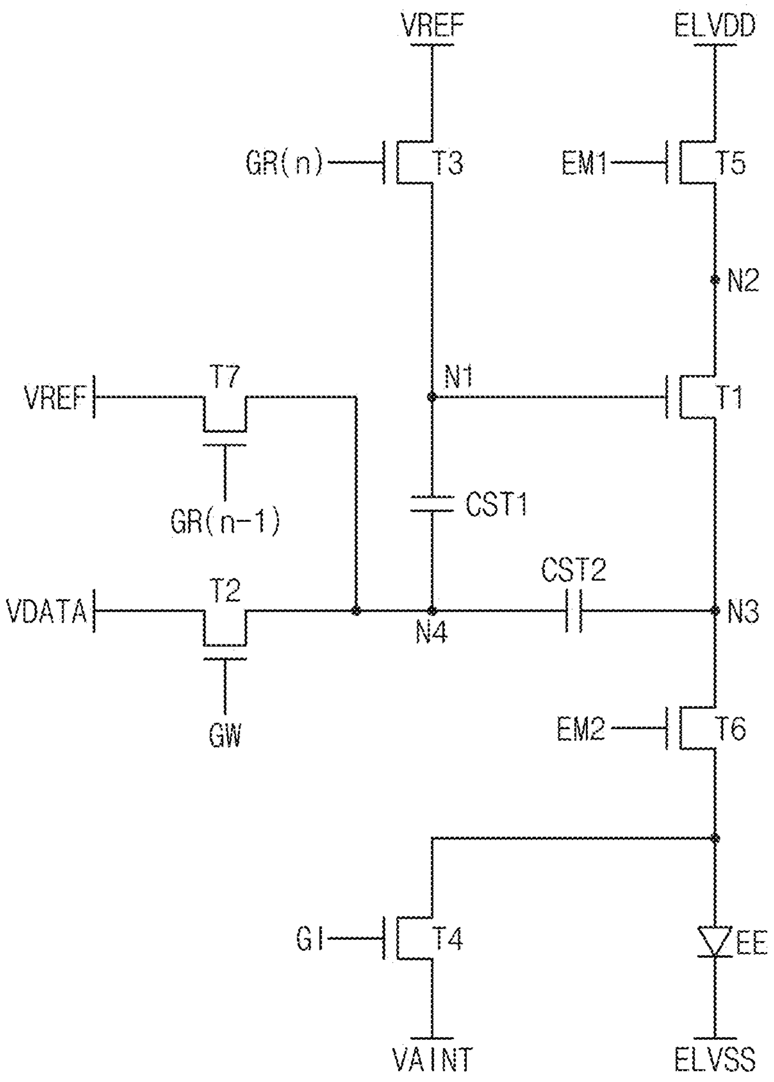
FIG. 9 is a circuit diagram illustrating a pixel of a display panel of a display apparatus according to an embodiment of the present disclosure.

FIG. 9 is a circuit diagram illustrating a pixel of a display panel of a display apparatus according to an embodiment of the present disclosure.

The display apparatus according to the present embodiment is substantially the same as the display apparatus of the previous embodiment explained referring to FIGS. 1 to 4 except that the second switching element is connected to the fourth node, the first reference gate signal is applied to the control electrode of the third switching element and the second reference gate signal is applied to the control electrode of the seventh switching element. Thus, the same reference numerals will be used to refer to the same or like parts as those described in the previous embodiment of FIGS. 1 to 4 and any repetitive explanation concerning the above elements will be omitted.

Referring to FIGS. 1, 3, 4 and 9, for example, the pixel may include a first switching element T1, a second switching element T2, a third switching element T3, a fourth switching element T4, a fifth switching element T5, a sixth switching element T6, a seventh switching element T7, a first capacitor CST1, a second capacitor CST2 and the light emitting element EE.

The first switching element T1 includes a control electrode connected to a first node N1, a first electrode connected to a second node N2 and a second electrode connected to a third node N3. The first switching element T1 may be referred to as a driving switching element.

The first capacitor CST1 includes a first electrode connected to the first node N1 and a second electrode connected to a fourth node N4.

The second capacitor CST2 includes a first electrode connected to the fourth node N4 and a second electrode connected to the third node N3.

The second switching element T2 applies the data voltage VDATA to the first capacitor CST1.

The third switching element T3 applies a reference voltage VREF to the first node N1.

The fourth switching element T4 includes a control electrode receiving the initialization gate signal GI, a first electrode receiving an initialization voltage VAINT and a second electrode connected to an anode electrode of the light emitting element EE.

The fifth switching element T5 includes a control electrode receiving the first emission signal EM1, a first electrode receiving a first power voltage ELVDD and a second electrode connected to the second node N2.

The sixth switching element T6 includes a control electrode receiving the second emission signal EM2, a first electrode connected to the third node N3 and a second electrode connected to the anode electrode.

The seventh switching element T7 applies the reference voltage VREF to the fourth node N4.

The light emitting element EE may include the anode electrode and a cathode electrode receiving a second power voltage ELVSS. For example, the first power voltage ELVDD may be greater than the second power voltage ELVSS.

For example, the initialization voltage VAINT may be less than the first power voltage ELVDD and may be greater than the second power voltage ELVSS.

In the present embodiment, the second switching element T2 may include a control electrode receiving the writing gate signal GW, a first electrode receiving the data voltage VDATA and a second electrode connected to the fourth node N4.

In the present embodiment, the seventh switching element T7 may include a control electrode receiving the second reference gate signal (e.g., GR(n−1)), a first electrode receiving the reference voltage VREF and a second electrode connected to the fourth node N4.

In the present embodiment, the third switching element T3 may include a control electrode receiving the first reference gate signal (e.g., GR(n)), a first electrode receiving the reference voltage VREF and a second electrode connected to the first node N1.

In the present embodiment, a white data voltage may be less than a black data voltage. In the present embodiment, a data voltage representing a high grayscale value may be less than a data voltage representing a low grayscale value. For example, the reference voltage VREF may be less than the black data voltage and greater than the white data voltage. For example, the reference voltage VREF may be less than the first power voltage ELVDD.

In the present embodiment, the first reference gate signal GR(n) may be a reference gate signal of an n-th stage. The second reference gate signal GR(n−1) may be a reference gate signal of one of previous stages with respect to the n-th stage. Herein, n may be a natural number equal to or greater than two. For example, the second reference gate signal GR(n−1) may be a reference gate signal of a right previous stage of the n-th stage. The n-th stage may mean a stage of a gate driving circuit corresponding to an n-th pixel row of the display panel 100.

With reference to an example in which first reference gate signal GR(n) is the reference gate signal of the n-th stage and the second reference gate signal GR(n−1) is the reference gate signal of one of the previous stages with respect to the n-th stage, the first reference gate signal GR(n) and the second reference gate signal GR(n−1) are generated from the same gate driving circuit such that a manufacturing cost of the display apparatus may be reduced and a dead space of the display apparatus may be reduced.

Alternatively, the first reference gate signal and the second reference gate signal may be independent signals generated from the independent gate driving circuits like the embodiment of FIGS. 5 and 6.

The driving timing of FIG. 3 and the driving timing of FIG. 4 may be applied to the pixel of FIG. 9.

In the writing period of the present embodiment, the second switching element T2 and the third switching element T3 may turn on such that the data voltage VDATA is written to the first capacitor CST1 with respect to the reference voltage VREF.

According to the present embodiment, the pixel includes the first capacitor CST1 and the second capacitor CST2 connected in series between the control electrode of the first switching element T1 and the second electrode of the first switch element T1 and includes the seventh switching element T7 applying the reference voltage VREF to the node between the first capacitor CST1 and the second capacitor CST2. The data voltage VDATA may be directly applied to the node N4 between the first capacitor CST1 and the second capacitor CST2.

The threshold voltage of the first switching element T1 may be applied to the second capacitor CST2 and the data voltage VDATA which is based on the reference voltage VREF may be directly applied to the first capacitor CST1 such that the swing range of the data voltage VDATA and the range of the gate-source voltage of the first switching element T1 may become similar.

The swing range of the data voltage VDATA and the range of the gate-source voltage of the first switching element T1 are similar such that a slope of the current-voltage curve of the first switching element T1 may be set low, and accordingly, the sensitivity of the first switching element T1 may be reduced.

According to the decrease of the sensitivity of the first switching element T1, the display quality decreases due to the crosstalk and the touch noise and the cycle mura may be prevented such that the display quality of the display panel 100 may be enhanced.

In some aspects, only the second capacitor CST2 may be initialized in the initialization period of the pixel such that an amount of the voltage for initialization may be reduced.

Figure 10:
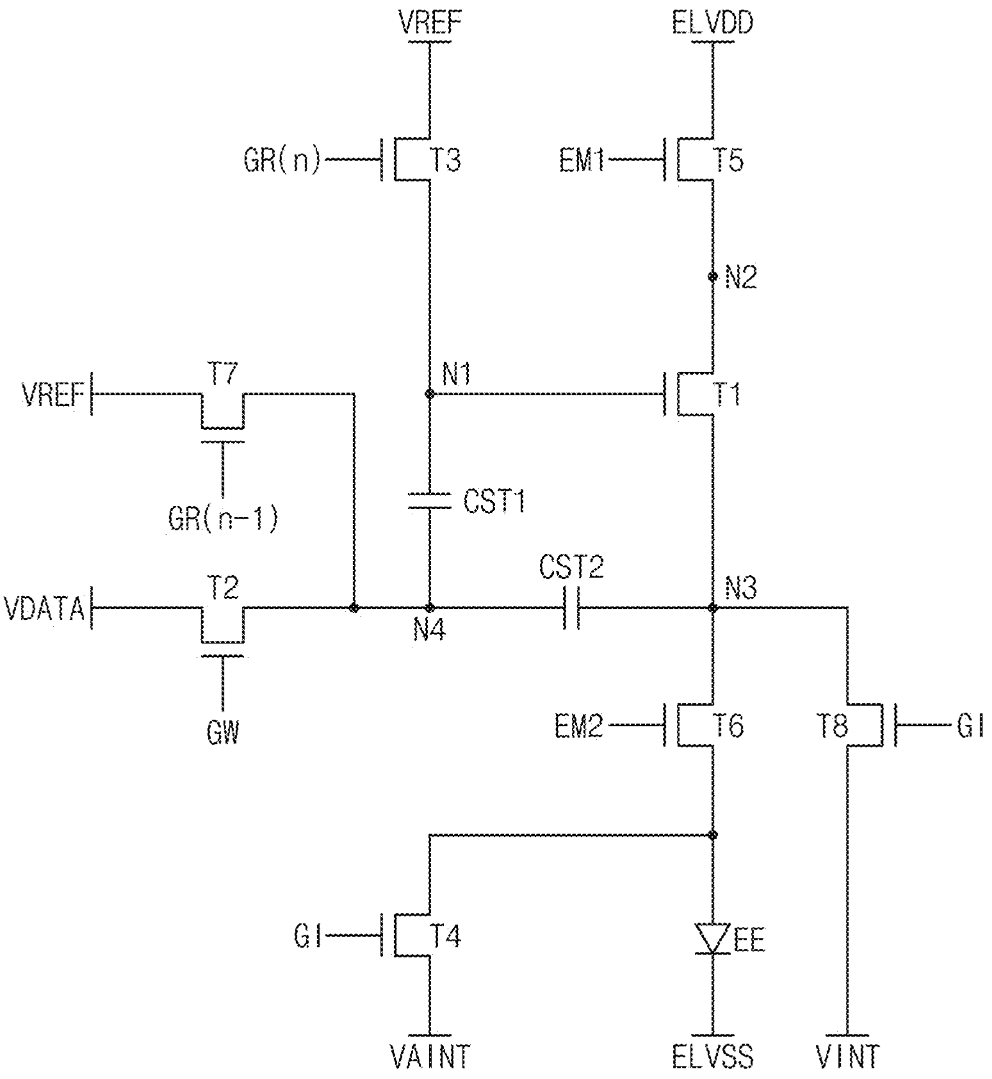
FIG. 10 is a circuit diagram illustrating a pixel of a display panel of a display apparatus according to an embodiment of the present disclosure.

FIG. 10 is a circuit diagram illustrating a pixel of a display panel 100 of a display apparatus according to an embodiment of the present disclosure.

The display apparatus according to the present embodiment is substantially the same as the display apparatus of the previous embodiment explained referring to FIGS. 1 and 9 except that the pixel further includes an eighth switching element. Thus, the same reference numerals will be used to refer to the same or like parts as those described in the previous embodiment of FIGS. 1 and 9 and any repetitive explanation concerning the above elements will be omitted.

Referring to FIGS. 1, 8 and 10, for example, the pixel may include a first switching element T1, a second switching element T2, a third switching element T3, a fourth switching element T4, a fifth switching element T5, a sixth switching element T6, a seventh switching element T7, a first capacitor CST1, a second capacitor CST2 and the light emitting element EE. The pixel may further include an eighth switching element T8.

In the present embodiment, the second switching element T2 may include a control electrode receiving the writing gate signal GW, a first electrode receiving the data voltage VDATA and a second electrode connected to the fourth node N4.

In the present embodiment, the seventh switching element T7 may include a control electrode receiving the second reference gate signal (e.g., GR(n−1)), a first electrode receiving the reference voltage VREF and a second electrode connected to the fourth node N4.

In the present embodiment, the third switching element T3 may include a control electrode receiving the first reference gate signal (e.g., GR(n)), a first electrode receiving the reference voltage VREF and a second electrode connected to the first node N1.

In the present embodiment, the first reference gate signal GR(n) may be a reference gate signal of an n-th stage. The second reference gate signal GR(n−1) may be a reference gate signal of one of previous stages with respect to the n-th stage. Herein, n may be a natural number equal to or greater than two. For example, the second reference gate signal GR(n−1) may be a reference gate signal of a right previous stage of the n-th stage. The n-th stage may mean a stage of a gate driving circuit corresponding to an n-th pixel row of the display panel 100.

Alternatively, the first reference gate signal and the second reference gate signal may be independent signals generated from the independent gate driving circuits like the embodiment of FIGS. 5 and 6.

The fourth switching element T4 includes a control electrode receiving the initialization gate signal GI, a first electrode receiving an initialization voltage VAINT and a second electrode connected to an anode electrode of the light emitting element EE.

The sixth switching element T6 includes a control electrode receiving the second emission signal EM2, a first electrode connected to the third node N3 and a second electrode connected to the anode electrode.

The eighth switching element T8 includes a control electrode receiving the initialization gate signal GI, a first electrode receiving a second initialization voltage VINT and a second electrode connected to the third node N3.

For example, the initialization voltage VAINT may be less than the first power voltage ELVDD and greater than the second power voltage ELVSS. For example, the second initialization voltage VINT may be less than the first power voltage ELVDD and greater than the second power voltage ELVSS. For example, the second initialization voltage VINT may be greater than the initialization voltage VAINT.

An optimal voltage for initializing the anode electrode of the light emitting element EE may be different from an optimal voltage for initializing the second electrode (the third node N3) of the second capacitor CST2. In the present embodiment, the initialization voltage VAINT initializing the anode electrode of the light emitting element EE and the second initialization voltage VINT initializing the second electrode (the third node N3) of the second capacitor CST2 may be differently set such that the display quality of the display panel 100 may be further enhanced.

The driving timing of FIG. 8 may be applied to the pixel of FIG. 10.

In the writing period of the present embodiment, the second switching element T2 and the third switching element T3 may turn on such that the data voltage VDATA is written to the first capacitor CST1 with respect to the reference voltage VREF.

According to the present embodiment, the pixel includes the first capacitor CST1 and the second capacitor CST2 connected in series between the control electrode of the first switching element T1 and the second electrode of the first switch element T1 and includes the seventh switching element T7 applying the reference voltage VREF to the node between the first capacitor CST1 and the second capacitor CST2. The data voltage VDATA may be directly applied to the node N4 between the first capacitor CST1 and the second capacitor CST2.

The threshold voltage of the first switching element T1 may be applied to the second capacitor CST2 and the data voltage VDATA which is based on the reference voltage VREF may be directly applied to the first capacitor CST1 such that the swing range of the data voltage VDATA and the range of the gate-source voltage of the first switching element T1 may become similar.

The swing range of the data voltage VDATA and the range of the gate-source voltage of the first switching element T1 are similar such that a slope of the current-voltage curve of the first switching element T1 may be set low, and accordingly, the sensitivity of the first switching element T1 may be reduced.

According to the decrease of the sensitivity of the first switching element T1, the display quality decreases due to the crosstalk and the touch noise and the cycle mura may be prevented such that the display quality of the display panel 100 may be enhanced.

In some aspects, only the second capacitor CST2 may be initialized in the initialization period of the pixel such that an amount of the voltage for initialization may be reduced.

Figure 11:
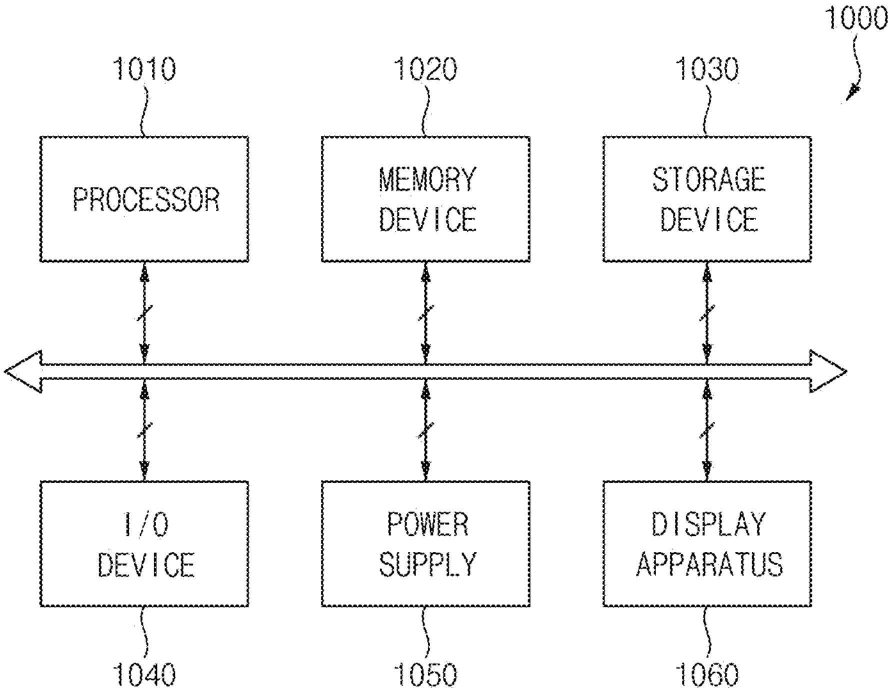
FIG. 11 is a block diagram illustrating an electronic apparatus according to an embodiment of the present disclosure.
Figure 12:
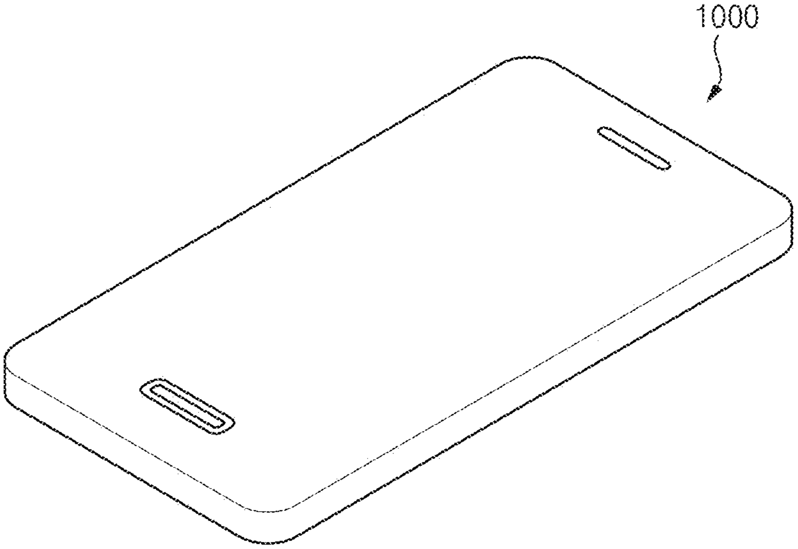
FIG. 12 is a diagram illustrating an example in which the electronic apparatus of FIG. 11 is implemented as a smartphone.
Figure 13:
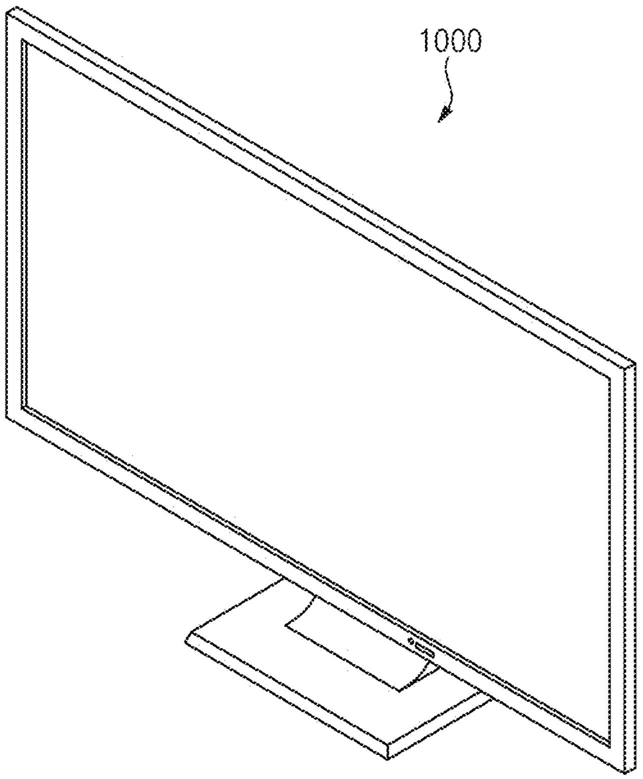
FIG. 13 is a diagram illustrating an example in which the electronic apparatus of FIG. 11 is implemented as a monitor.

FIG. 11 is a block diagram illustrating an electronic apparatus 1000 according to an embodiment of the present disclosure. FIG. 12 is a diagram illustrating an example in which the electronic apparatus 1000 of FIG. 11 is implemented as a smartphone. FIG. 13 is a diagram illustrating an example in which the electronic apparatus 1000 of FIG. 11 is implemented as a monitor.

Referring to FIGS. 11 to 13, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In some aspects, the electronic apparatus 1000 may further include a plurality of ports for communicating with a video card, a sound card, a memory card, a universal serial bus (USB) device, other electronic apparatuses, or the like.

In an embodiment, as illustrated in FIG. 12, the electronic apparatus 1000 may be implemented as a smartphone. In an embodiment, as illustrated in FIG. 13, the electronic apparatus 1000 may be implemented as a monitor. However, the electronic apparatus 1000 is not limited thereto. For example, the electronic apparatus 1000 may be implemented as a television, a cellular phone, a video phone, a smart pad, a smart watch, a tablet PC, a car navigation system, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, or the like. Further, the processor 1010 may be coupled to an extended bus such as, for example, a peripheral component interconnection (PCI) bus.

The processor 1010 may output the input image data IMG and the input control signal CONT to the driving controller 200 of FIG. 1. The processor 1010 may also be referred to a host.

The memory device 1020 may store data for operations of the electronic apparatus 1000. For example, the memory device 1020 may include at least one non-volatile memory device such as, for example, an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as, for example, a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as, for example, a keyboard, a keypad, a mouse device, a touch-pad, a touch-screen, and the like and an output device such as, for example, a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

According to the embodiments of the pixel, the display apparatus including the pixel and the electronic apparatus including the pixel, the display quality of the display panel may be enhanced.

The foregoing is illustrative of the present disclosure and is not to be construed as limiting thereof. Although example embodiments of the present disclosure have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of example aspects supported by the present disclosure and is not to be construed as limited to the specific embodiments disclosed, and that modifications to the disclosed embodiments, as well as other embodiments, are intended to be included within the scope of the appended claims. Embodiments supported by the present disclosure are defined by the following claims, with equivalents of the claims to be included therein.

What is claimed is:

1. A pixel comprising:

a light emitting element;

a first switching element comprising a control electrode connected to a first node, a first electrode connected to a second node, and a second electrode connected to a third node;

a first capacitor comprising a first electrode connected to the first node and a second electrode connected to a fourth node;

a second capacitor comprising a first electrode connected to the fourth node and a second electrode connected to the third node;

a second switching element applying a data voltage to the first capacitor;

a third switching element applying a reference voltage to the first node;

a fourth switching element comprising a control electrode receiving an initialization gate signal, a first electrode receiving an initialization voltage, and a second electrode connected to an anode electrode of the light emitting element;

a fifth switching element comprising a control electrode receiving a first emission signal, a first electrode receiving a first power voltage, and a second electrode connected to the second node;

a sixth switching element comprising a control electrode receiving a second emission signal, a first electrode connected to the third node, and a second electrode connected to the anode electrode; and a seventh switching element applying the reference voltage to the fourth node.

2. The pixel of claim 1, wherein the second switching element comprises a control electrode receiving a writing gate signal, a first electrode receiving the data voltage, and a second electrode connected to the first node.

3. The pixel of claim 2, wherein the seventh switching element comprises a control electrode receiving a first reference gate signal, a first electrode receiving the reference voltage, and a second electrode connected to the fourth node.

4. The pixel of claim 3, wherein the third switching element comprises a control electrode receiving a second reference gate signal, a first electrode receiving the reference voltage, and a second electrode connected to the first node.

5. The pixel of claim 4, wherein:

the first reference gate signal is a reference gate signal of an n-th stage, the second reference gate signal is a reference gate signal of one of previous stages with respect to the n-th stage, and n is a natural number equal to or greater than two.

6. The pixel of claim 4, wherein:

the first emission signal has an inactive level in an initialization period, the second emission signal has an active level in the initialization period, the initialization gate signal has an active level in the initialization period, and the writing gate signal has an inactive level in the initialization period.

7. The pixel of claim 6, wherein:

the first emission signal has an active level in a compensation period subsequent to the initialization period, the second emission signal has an inactive level in the compensation period, the second reference gate signal has an active level in the compensation period, the first reference gate signal has an active level in the compensation period, the initialization gate signal has an inactive level in the compensation period, and the writing gate signal has the inactive level in the compensation period.

8. The pixel of claim 7, wherein:

the first emission signal has the inactive level in a writing period subsequent to the compensation period, the second emission signal has the inactive level in the writing period, the second reference gate signal has an inactive level in the writing period, the first reference gate signal has the active level in the writing period, the initialization gate signal has the inactive level in the writing period, and wherein the writing gate signal has an active pulse in the writing period.

9. The pixel of claim 8, wherein:

the first emission signal has the active level in a light emission period subsequent to the writing period, the second emission signal has the active level in the light emission period, the initialization gate signal has the inactive level in the light emission period, and the writing gate signal has the inactive level in the light emission period.

10. The pixel of claim 9, wherein:

the first emission signal has the inactive level in a second initialization period subsequent to the writing period, the second emission signal has the active level in the second initialization period, the initialization gate signal has the active level in the second initialization period, and the writing gate signal has the inactive level in the second initialization period.

11. The pixel of claim 4, wherein the second switching element and the seventh switching element turn on in a writing period.

12. The pixel of claim 4, further comprising an eighth switching element comprising a control electrode receiving the initialization gate signal, a first electrode receiving a second initialization voltage, and a second electrode connected to the third node.

13. The pixel of claim 12, wherein:

the first emission signal has an inactive level in an initialization period, the second emission signal has an inactive level in the initialization period, the initialization gate signal has an active level in the initialization period, and the writing gate signal has an inactive level in the initialization period.

14. The pixel of claim 13, wherein:

the first emission signal has an active level in a compensation period subsequent to the initialization period, the second emission signal has the inactive level in the compensation period, the second reference gate signal has an active level in the compensation period, the first reference gate signal has an active level in the compensation period, the initialization gate signal has an inactive level in the compensation period, the writing gate signal has the inactive level in the compensation period, the first emission signal has the inactive level in a writing period subsequent to the compensation period, the second emission signal has the inactive level in the writing period, the second reference gate signal has an inactive level in the writing period, the first reference gate signal has the active level in the writing period, the initialization gate signal has the inactive level in the writing period, the writing gate signal has an active pulse in the writing period, the first emission signal has the active level in a light emission period subsequent to the writing period, the second emission signal has an active level in the light emission period, the initialization gate signal has the inactive level in the light emission period, and the writing gate signal has the inactive level in the light emission period.

15. The pixel of claim 1, wherein the second switching element comprises a control electrode receiving a writing gate signal, a first electrode receiving the data voltage, and a second electrode connected to the fourth node.

16. The pixel of claim 15, wherein the seventh switching element comprises a control electrode receiving a second reference gate signal, a first electrode receiving the reference voltage, and a second electrode connected to the fourth node.

17. The pixel of claim 16, wherein the third switching element comprises a control electrode receiving a first reference gate signal, a first electrode receiving the reference voltage, and a second electrode connected to the first node.

18. The pixel of claim 17, wherein:

the first reference gate signal is a reference gate signal of an n-th stage, the second reference gate signal is a reference gate signal of one of previous stages with respect to the n-th stage, and n is a natural number equal to or greater than two.

19. A display apparatus comprising:

a display panel comprising a pixel;

a gate driver outputting an initialization gate signal to the pixel;

a data driver outputting a data voltage to the pixel; and an emission driver outputting a first emission signal and a second emission signal, wherein the pixel comprises:

a light emitting element;

a first switching element comprising a control electrode connected to a first node, a first electrode connected to a second node, and a second electrode connected to a third node;

a first capacitor comprising a first electrode connected to the first node and a second electrode connected to a fourth node;

a second capacitor comprising a first electrode connected to the fourth node and a second electrode connected to the third node;

a second switching element applying the data voltage to the first capacitor;

a third switching element applying a reference voltage to the first node;

a fourth switching element comprising a control electrode receiving the initialization gate signal, a first electrode receiving an initialization voltage, and a second electrode connected to an anode electrode of the light emitting element;

a fifth switching element comprising a control electrode receiving the first emission signal, a first electrode receiving a first power voltage, and a second electrode connected to the second node;

a sixth switching element comprising a control electrode receiving the second emission signal, a first electrode connected to the third node, and a second electrode connected to the anode electrode; and a seventh switching element applying the reference voltage to the fourth node.

20. An electronic apparatus comprising:

a display panel comprising a pixel;

a gate driver outputting an initialization gate signal to the pixel;

a data driver outputting a data voltage to the pixel;

an emission driver outputting a first emission signal and a second emission signal;

a driving controller controlling the gate driver, the data driver, and the emission driver; and a processor outputting input image data and an input control signal to the driving controller, wherein the pixel comprises:

a light emitting element;

a first switching element comprising a control electrode connected to a first node, a first electrode connected to a second node, and a second electrode connected to a third node;

a first capacitor comprising a first electrode connected to the first node and a second electrode connected to a fourth node;

a second capacitor comprising a first electrode connected to the fourth node and a second electrode connected to the third node;

a second switching element applying the data voltage to the first capacitor;

a third switching element applying a reference voltage to the first node;

a fourth switching element comprising a control electrode receiving the initialization gate signal, a first electrode receiving an initialization voltage, and a second electrode connected to an anode electrode of the light emitting element;

a fifth switching element comprising a control electrode receiving the first emission signal, a first electrode receiving a first power voltage, and a second electrode connected to the second node;

a sixth switching element comprising a control electrode receiving the second emission signal, a first electrode connected to the third node, and a second electrode connected to the anode electrode; and a seventh switching element applying the reference voltage to the fourth node.

* * * * *